(12) United States Patent
Jette

(10) Patent No.: US 12,288,971 B2
(45) Date of Patent: Apr. 29, 2025

(54) CABLE MANAGEMENT APPARATUS, SYSTEMS, AND METHODS

(71) Applicant: Cable Management Solutions Inc., Bayshore, NY (US)

(72) Inventor: Roger Jette, East Islip, NY (US)

(73) Assignee: Cable Management Solutions Inc., Bayshore, NY (US)

( * ) Notice: Subject to any disclaimer, the term of this patent is extended or adjusted under 35 U.S.C. 154(b) by 0 days.

(21) Appl. No.: 18/410,237

(22) Filed: Jan. 11, 2024

(65) Prior Publication Data

US 2024/0275152 A1    Aug. 15, 2024

Related U.S. Application Data

(60) Provisional application No. 63/444,533, filed on Feb. 9, 2023.

(51) Int. Cl.
*F16L 3/233*    (2006.01)
*H02G 3/00*    (2006.01)
*H02G 3/04*    (2006.01)

(52) U.S. Cl.
CPC ........... *H02G 3/263* (2013.01); *H02G 3/0443* (2013.01)

(58) Field of Classification Search
CPC ......... H02G 3/263; H02G 3/0443; H02G 3/32
See application file for complete search history.

(56) References Cited

U.S. PATENT DOCUMENTS

| | | | | |
|---|---|---|---|---|
| 3,787,590 | A | * | 1/1974 | Bolger ..................... A23F 3/16 |
| | | | | 426/597 |
| 5,839,702 | A | | 11/1998 | Jette |
| 6,019,323 | A | | 2/2000 | Jette |
| 6,361,000 | B1 | | 3/2002 | Jette |
| 6,460,812 | B1 | | 10/2002 | Jette |
| 6,637,704 | B2 | | 10/2003 | Jette |
| 6,926,236 | B2 | | 8/2005 | Jette |
| 7,959,019 | B2 | | 6/2011 | Jette |
| 8,985,530 | B2 | | 3/2015 | Jette |
| 9,074,707 | B2 | | 7/2015 | Jette |
| 9,722,405 | B2 | | 8/2017 | Smith et al. |
| 9,800,028 | B1 | * | 10/2017 | Smith .................. H02G 3/0443 |
| 10,225,947 | B2 | | 3/2019 | Jette |

(Continued)

*Primary Examiner* — Amy J. Sterling
(74) *Attorney, Agent, or Firm* — Carter, DeLuca & Farrell LLP

(57) ABSTRACT

A cable management apparatus includes an attachment clip including a first hook portion configured to be suspended from an elongated structure, a first retaining segment defining a mouth, and a capture arm defining a second hook portion. The second hook portion is configured to engage the elongated structure between first and second segments of the attachment clip to thereby secure the cable management apparatus about the elongated structure and close the mouth of the first retaining segment. The cable management apparatus is formed from a single piece of material. A method includes suspending the cable management apparatus from an elongated structure using the attachment clip, inserting cables through the mouth and into the first retaining segment, and engaging the capture arm to the elongated structure between first and second portions of the attachment clip to thereby secure the cable management apparatus about the elongated structure and close the mouth.

12 Claims, 6 Drawing Sheets

(56) References Cited

U.S. PATENT DOCUMENTS

| | | |
|---|---|---|
| 10,666,029 B2 | 5/2020 | Jette |
| 10,670,170 B2 * | 6/2020 | Shea ........................ F16L 3/127 |
| 11,205,890 B2 | 12/2021 | Jette |
| D1,007,284 S | 12/2023 | Martin |
| D1,007,285 S | 12/2023 | Martin |
| D1,007,286 S | 12/2023 | Martin |
| D1,008,004 S | 12/2023 | Roccapriore |
| D1,008,006 S | 12/2023 | Martin |
| D1,008,007 S | 12/2023 | Martin |
| 11,967,815 B2 * | 4/2024 | Worden ................. H02G 3/263 |
| 2001/0007341 A1 | 7/2001 | Jette |
| 2003/0213191 A1 | 11/2003 | Jette |
| 2004/0049998 A1 | 3/2004 | Jette |
| 2004/0055232 A1 | 3/2004 | Jette |
| 2017/0338638 A1 | 11/2017 | Smith et al. |
| 2018/0313469 A1 | 11/2018 | Jette |
| 2020/0403390 A1 | 12/2020 | Jette |
| 2021/0126445 A1 | 4/2021 | Jette |
| 2021/0194419 A1 | 6/2021 | Jette |
| 2022/0112969 A1 | 4/2022 | Jette |
| 2023/0420925 A1 | 12/2023 | Martin |

* cited by examiner

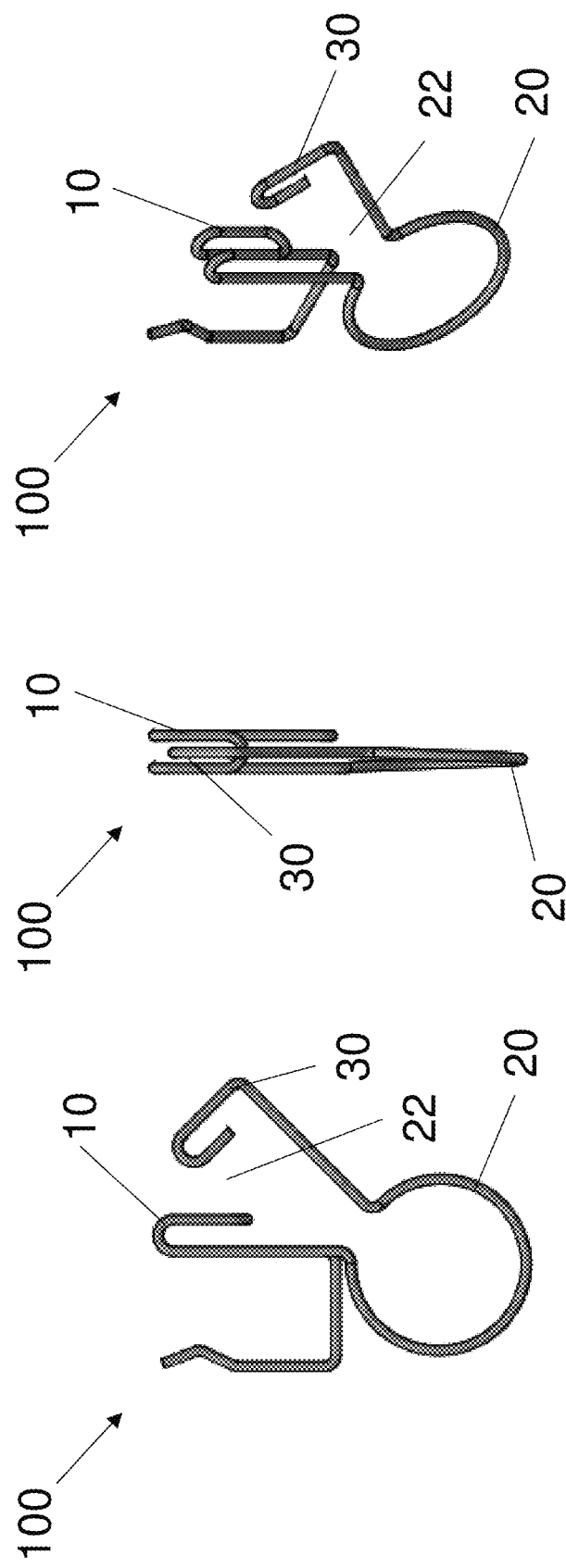

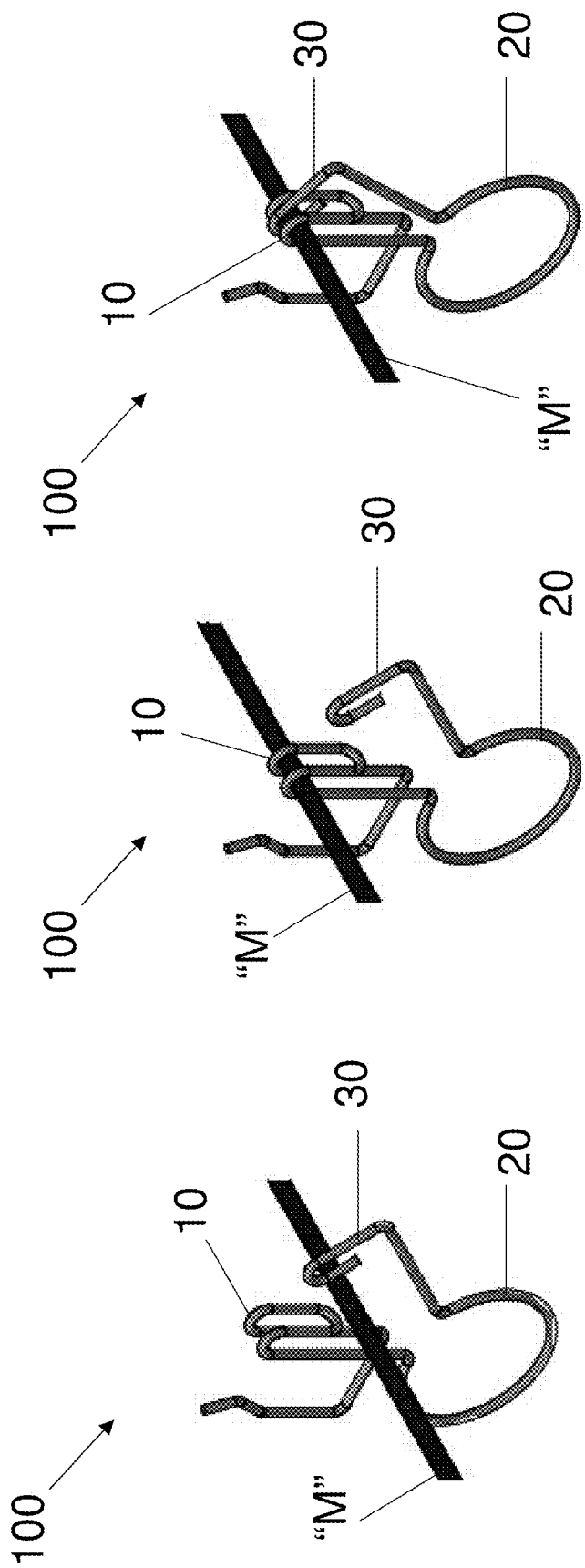

CABLE MANAGEMENT APPARATUS, SYSTEMS, AND METHODS

CROSS-REFERENCE TO RELATED APPLICATIONS

This application claims the benefit of and priority to U.S. Provisional Patent Application No. 63/444,533, filed on Feb. 9, 2023, the entire contents of which are hereby incorporated herein by reference.

BACKGROUND

Technical Field

The present disclosure relates to cable management and, more particularly, to a flexible cable management apparatus, systems, and methods for routing cables, conduits, or other elongated structures to be retained and conveyed.

Background of Related Art

Due to the increasing usage of power, communication, data, and other cable-dependent systems, greater numbers of cables are required to interconnect various systems with one another and with various peripheral devices. As a result, cable management systems have been developed to deal with the task of organizing and routing cables to their destinations, sometimes across long distances. As can be appreciated, these cable management systems must be capable of securely retaining one or more cables and routing the cables to their destinations.

SUMMARY

To the extent consistent, any of the aspects detailed herein may be used in conjunction with any or all of the other aspects detailed herein. Further, although reference is made herein to a "cable" or "cables," it is understood that this reference also includes conduits or other elongated structures to be retained and conveyed.

The present disclosure provides cable management apparatus, systems, and methods which may find particular applicability in the solar industry, although the cable management apparatus, systems, and methods of the present disclosure are also applicable to other industries. With respect to the solar industry, for example, the cable management apparatus, systems, and methods of the present disclosure enable, in aspects, pre-loading of the apparatus with string cables while feeder cables can be subsequently loaded onto the apparatus. This configuration allows the apparatus to be lifted into place on a messenger strand unimpeded and enables single-handed closure and securement of the apparatus, eliminating the need for multiple hand operations and/or specialized tools. In the secured position about the messenger strand, the apparatus is retained and stabilized in all vectors that would act upon the apparatus, such as wind, vibration, or seismic activity, thus providing a secure engagement. Further, once the apparatus is secured about the messenger strand, the apparatus is prevented from sliding longitudinally along the messenger strand. The apparatus includes a functional ring-shaped structure that both acts as the containment for string cables and provides spring tension to maintain the apparatus in closed, secure engagement about the messenger strand.

A cable support apparatus provided in accordance with aspects of the present disclosure includes an attachment clip, a first retaining segment, and a capture arm. The attachment clip includes first and second segments interconnected at a first hook portion. The first hook portion is configured to be suspended from an elongated structure. The first retaining segment includes first and second ends defining a mouth therebetween. The first end of the first retaining segment extends from the first segment of the attachment clip. The capture arm extends from the second end of the first retaining segment to a second hook portion. The second hook portion of the capture arm is configured to engage the elongated structure between the first and second segments of the attachment clip to thereby secure the cable management apparatus about the elongated structure and close the mouth of the first retaining segment. The cable management apparatus is formed from a single piece of material.

In an aspect of the present disclosure, the cable management apparatus further comprises a second retaining segment extending from the second segment of the attachment clip.

In another aspect of the present disclosure, the second retaining segment defines a permanently open configuration.

In yet another aspect of the present disclosure, the first retaining segment extends along a helical path.

In still another aspect of the present disclosure, the first retaining segment defines a circular configuration.

In still yet another aspect of the present disclosure, cables disposed within the first retaining segment facilitate the securement of the cable management apparatus about the elongated structure.

In another aspect of the present disclosure, the capture arm is movable between a position wherein the second hook portion is transversely spaced apart from the attachment clip corresponding to an open configuration of the cable management apparatus and a position wherein the second hook portion of the capture arm overlaps the attachment clip to engage the elongated structure, corresponding to a closed configuration of the cable management apparatus.

In another aspect of the present disclosure, the attachment clip and the capture arm define a fully enclosed passageway retaining the elongated structure therein in the closed configuration.

In still another aspect of the present disclosure, the single piece of material is wire stock.

A method for cable management provided in accordance with the present disclosure includes suspending a cable management apparatus from an elongated structure using an attachment clip of the cable management apparatus, inserting cables through a mouth of the cable management apparatus and into a first retaining segment of the cable management apparatus, and engaging a capture arm of the cable management apparatus about the elongated structure between first and second portions of the attachment clip to thereby secure the cable management apparatus about the elongated structure and close the mouth.

The inserting may be performed before or after the suspending.

In an aspect of the present disclosure, the method further includes inserting cables into a second retaining segment of the cable management apparatus. This inserting of the cables into the second retaining segment may be performed before or after the engaging.

In another aspect of the present disclosure, the engaging includes hooking a hooked end of the capture arm about the elongated structure.

In yet another aspect of the present disclosure, the suspending includes hooking a hook portion of the attachment clip about the elongated structure.

Cable management systems of the present disclosure may include plural of the cable management apparatus of the present disclosure spaced-apart along an elongated structure, e.g., a messenger strand, and retaining cables within the retaining segment(s) along the lengths of the cables.

BRIEF DESCRIPTION OF THE DRAWINGS

Various aspects of the present disclosure are described herein with reference to the drawings, wherein:

FIGS. 3A, 3B, and 3C are side, front, and perspective views, respectively, of the cable support apparatus of FIG. 1A, wherein the cable support apparatus is disposed in an open configuration;

FIGS. 6A-6C are perspective views illustrating, in more detail, engagement and securement of the cable support apparatus of FIG. 1A about the messenger strand.

DETAILED DESCRIPTION

Figure 1B:
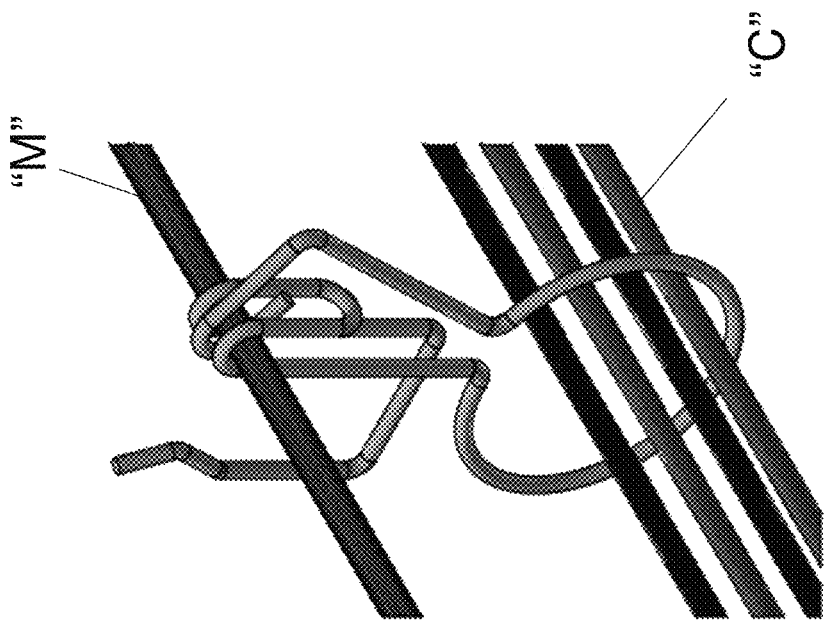
FIG. 1B is a perspective view of the cable support apparatus of FIG. 1A including cables retained therein, wherein the cable support apparatus is secured about a messenger strand.
Figure 1A:
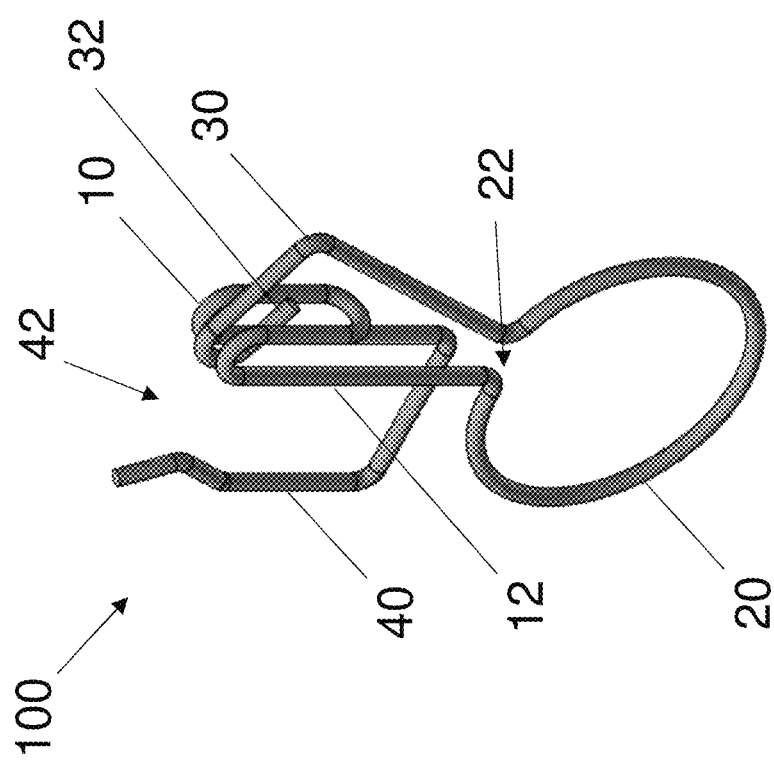
FIG. 1A is a perspective view of a cable support apparatus provided in accordance with the present disclosure wherein the cable support apparatus is disposed in a closed configuration.

Turning to FIGS. 1A and 1B, a cable management apparatus in accordance with the present disclosure is shown generally identified by reference numeral 100. Cable management apparatus 100 is manufactured from a single piece of material, for example, a single piece of wire stock, a single tube of plastic, and/or any other suitable, at least partially flexible or bendable material. The single piece of material may be coated, for example, with rubber, powder, and/or other substance. Cable management apparatus 100 generally includes an attachment clip 10, a first retaining segment 20, and a capture arm 30. In aspects, cable management apparatus 100 further includes one or more additional retaining segments such as second retaining segment 40. Both attachment clip 10 and capture arm 30 are configured to interface with a messenger strand "M" to secure cable management apparatus 100 in suspension about messenger strand "M" and also to enclose first retaining segment 20 to inhibit escape of cables "C" therefrom. First retaining segment 20 defines a mouth 22 in the open configuration of cable management apparatus 100 that enables one or more cables "C" to be fed transversely into first retaining segment 20.

Attachment clip 10 is configured to removably engage messenger strand "M." Attachment clip 10, more specifically, may define a hooked U-shape such that attachment clip 10 may be positioned above and thereafter moved downwardly to capture messenger strand "M" within the hooked U-shape portion thereof. Extending downward from one upright segment of the hooked U-shape portion of attachment clip 10 is an upright extension 12 that connects attachment clip 10 to first retaining segment 20. First retaining segment 20 is configured to hold cables "C" therein. First retaining segment 20 may define any suitable shape, for example, a circle, as shown. In aspects, first retaining segment 20 may alternatively define a rectangular, triangular, or other suitable shape. First retaining segment 20 extends from upright extension 12 to capture arm 30. Mouth 22 is defined between a first end of first retaining segment 20 that is connected to first upright extension 12 and a second end of first retaining segment 20 that is connected to capture arm 30. That is, in an open configuration of cable management apparatus 100, the first and second ends of first retaining segment 20 are spaced apart from one another in a non-overlapping manner to define mouth 22 therebetween. Thus, in this open configuration of cable management apparatus, mouth 22 is defined to allow cables "C" or other elongated structures to be fed transversely into first retaining segment 20.

Capture arm 30 extends upward from the second end of first retaining segment 20 (and mouth 22) to a hooked free end 32. Capture arm 30 may be suspended from messenger strand "M" by capturing messenger strand "M" within hooked free end 32. Further, capture arm 30 may be suspended from messenger strand "M" with hooked free end 32 disposed between the two spaced-apart segments forming attachment clip 10. As a result, mouth 22 is closed to inhibit escape of cables from first retaining segment 20 and cable management apparatus 100 is secured and stabilized about messenger strand "M" in all vectors. Further, this securement provides sufficient engagement of cable management apparatus 100 with messenger strand "M" in multiple directions to thereby inhibit longitudinal sliding of cable management apparatus 100 along messenger strand "M."

Attachment clip 10 and capture arm 30 are shaped such that each may be secured to messenger strand "M" in a single hand operation, eliminating the need for multiple hands and/or additional tools. When attached to messenger strand "M," capture arm 30 closes mouth 22, securing cable "C" within first retaining segment 20, as noted above. First retaining segment 20 also provides spring tension, aided by the weight of cables "C" disposed thereon, thereby holding cable management apparatus 100 in a closed configuration, secured about messenger strand "M" and preventing cable management apparatus 100 from being moved by outside forces such as wind, vibration, or seismic activity, longitudinally along messenger strand "M" or otherwise.

Cable management apparatus 100 may include, as noted above, one or more additional retaining segments such as second retaining segment 40. Second retaining segment 40 may define an open configuration having a permanent opening 42 such as, for example, defining a U-shaped configuration, for receipt of cables "C" therein. For example, in applications for the solar industry, second retaining segment 40 may be loaded with feeders. Opening 42 of second retaining segment 40 may be larger than the mouth 22 of first retaining segment 20, allowing cables "C" or other components to be lifted into place unobstructed. In aspects, second retaining segment 40 extends downwardly from the other upright segment of the hooked U-shape portion of attachment clip 10 in a direction opposite of first retaining segment 20 such that first and second retaining segments 20, 40 support cables "C" in spaced apart relation and without interference therebetween (see also FIG. 5B).

Figure 2B:
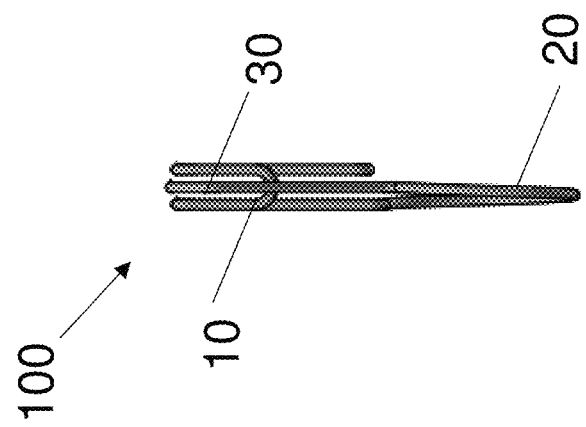
FIGS. 2A and 2B are side and front views, respectively, of the cable support apparatus of FIG. 1A, wherein the cable support apparatus in disposed in the closed configuration.
Figure 2A:
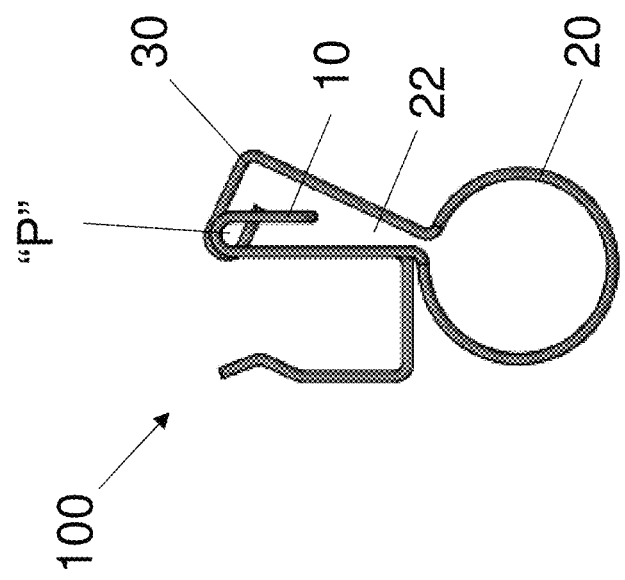

Moving on to FIG. 2A, cable management apparatus 100 is disposed in the closed configuration wherein a fully enclosed passageway "P" is defined by attachment clip 10 and capture arm 30 to enable full surrounding and securement of cable management apparatus 100 about messenger strand "M" (FIGS. 1A and 1B). Further, first retaining segment 20 is closed, inhibiting insertion or removal of cables from mouth 22.

Turning to FIG. 2B, first retaining segment 20 defines a helical-shaped configuration wherein the first end of first retaining segment 20 is longitudinally offset relative to the second end of first retaining segment 20. As a result, the first upright segment of the hooked U-shape portion of attachment clip 10 is longitudinally offset from capture arm 30. The second upright segment of the hooked U-shape portion of attachment clip 10 is also longitudinally offset from capture arm 30, on the opposing side thereof compared to the first upright segment of hooked U-shape portion of attachment clip 10.

FIGS. 3A-3C illustrate the open configuration of cable management apparatus 100, wherein mouth 22 is accessible to enable insertion and removal of cables to and from first retaining segment 20. Also, in this position, attachment clip 10 may be readily suspended from a messenger strand prior the securement thereof with capture arm 30.

Figure 4A:
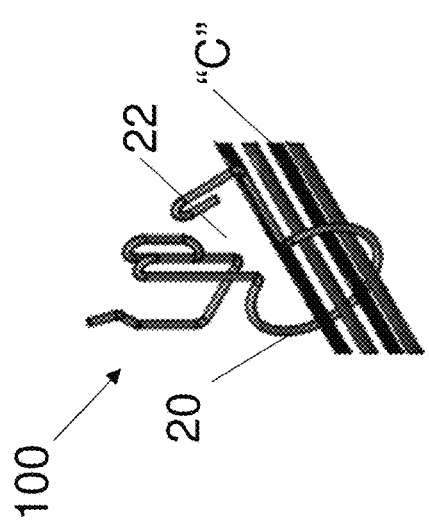
FIGS. 4A-4E are perspective views of the cable support apparatus of FIG. 1A progressively illustrating cables entering the cable support apparatus via a mouth of the cable support apparatus, hanging the cable support apparatus about a messenger strand, and closure of the cable support apparatus to secure the cable support apparatus about the messenger strand.

FIGS. 4A-4E illustrate the method of supporting cables "C" within cable management apparatus 100 and securing cable management apparatus 100 from a messenger strand "M." Initially, as shown in FIG. 4A, with cable management apparatus 100 disposed in the open configuration, cables "C" are inserted through mouth 22 and into first retaining segment 20.

Figure 4B:
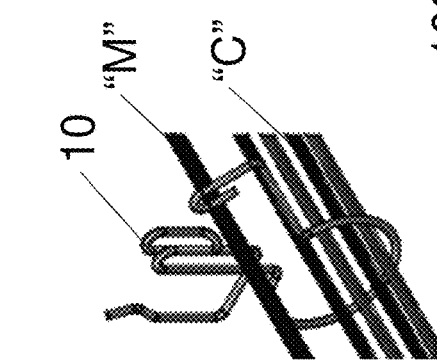
Figure 4C:
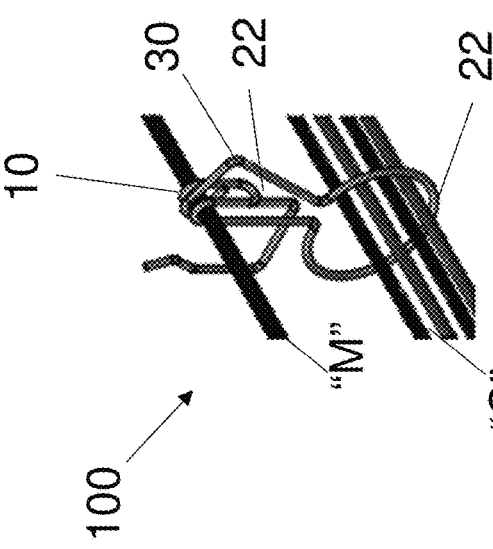
Figure 4D:
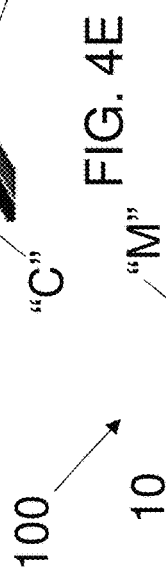

Next, referring to FIGS. 4B-4D, cable management apparatus 100, with cables "C" disposed within first retaining segment 20, is maneuvered relative to messenger strand "M" to hook messenger strand "M" with attachment clip 10 such that cable management apparatus 100 is suspended from messenger strand "M." At this point, cable management apparatus 100 is still disposed in the open configuration.

Figure 4E:
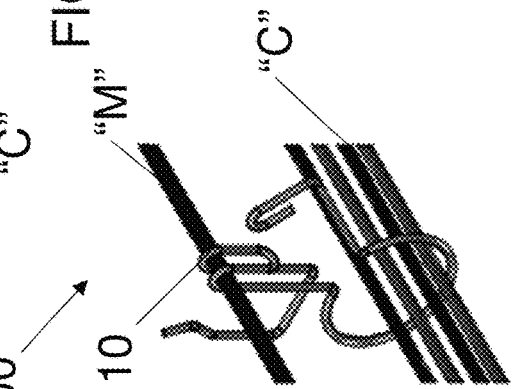

Turning to FIG. 4E, once cable management apparatus 100 is suspended from messenger strand "M," cable management apparatus 100 is transitioned to the closed configuration by hooking capture arm 30 about messenger strand "M" between the upright segments of attachment clip 10. This closes mouth 22 to secure the cables "C" within first retaining segment 20 and also secures cable management apparatus 100 about messenger strand "M." This transitioning of cable management apparatus 100 to the closed configuration by hooking capture arm 30 about messenger strand "M" between the upright segments of attachment clip 10 is shown in more detail in FIGS. 6A-6C.

Figure 5B:
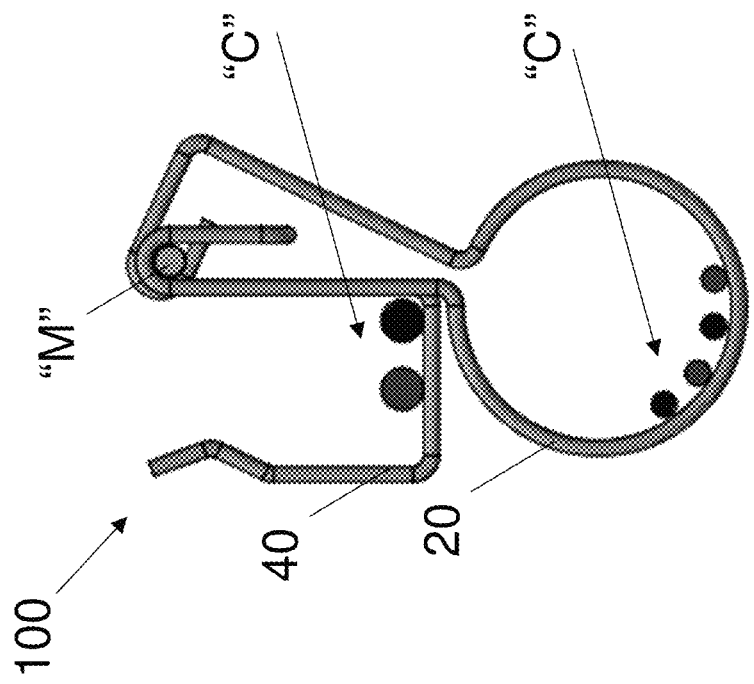
FIG. 5B is a side view of the cable support apparatus of FIG. 1A, wherein the cable support apparatus is disposed in the closed configuration secured on the messenger strand with cables supported therein.
Figure 5A:
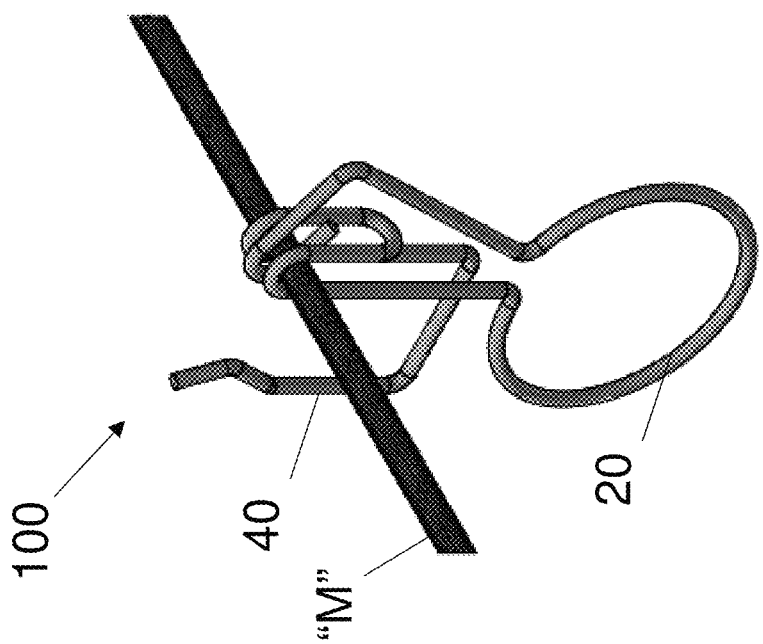
FIG. 5A is a perspective view of the cable support apparatus of FIG. 1A, wherein the cable support apparatus is disposed in closed configuration secured on the messenger strand.

With reference to FIGS. 5A and 5B illustrate cable management apparatus 100 in the closed configuration secured about messenger strand "M." With reference in particular to FIG. 5B, cables "C" are retained within first retaining segment 20 and cables "C" are disposed within second retaining segment 40. Second retaining segment 40 may be configured to support larger cables "C" as compared to first retaining segment 20 (as shown), although other configurations are also contemplated. Further, first and second retaining segments 20, 40, respectively, may be sufficiently spaced so as to inhibit any electrical interference between the cables "C" disposed therein.

From the foregoing and with reference to the various figure drawings, those skilled in the art will appreciate that certain modifications can also be made to the present disclosure without departing from the scope of the same. While several aspects of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular aspects. Those skilled in the art will envision other modifications within the scope and spirit of the claims appended hereto.

What is claimed:

1. A cable management apparatus, comprising:
an attachment clip including first and second segments interconnected at a first hook portion, the first hook portion configured to be suspended from an elongated structure;
a first retaining segment including first and second ends defining a mouth therebetween, the first end of the first retaining segment extending from the first segment of the attachment clip; and
a capture arm extending from the second end of the first retaining segment to a second hook portion,
wherein the second hook portion of the capture arm is configured to engage the elongated structure between the first and second segments of the attachment clip to thereby secure the cable management apparatus about the elongated structure and close the mouth of the first retaining segment, and
wherein the cable management apparatus is formed from a single piece of material.

2. The cable management apparatus of claim 1, further comprising a second retaining segment extending from the second segment of the attachment clip.

3. The cable management apparatus of claim 2, wherein the second retaining segment defines a permanently open configuration.

4. The cable management apparatus of claim 1, wherein the first retaining segment extends along a helical path.

5. The cable management apparatus of claim 1, wherein the first retaining segment defines a circular configuration.

6. The cable management apparatus of claim 1, wherein cables disposed within the first retaining segment facilitate the securement of the cable management apparatus about the elongated structure.

7. The cable management apparatus of claim 1, wherein the capture arm is movable between a position wherein the second hook portion is transversely spaced apart from the attachment clip corresponding to an open configuration of the cable management apparatus and a position wherein the second hook portion of the capture arm overlaps the attachment clip to engage the elongated structure, corresponding to a closed configuration of the cable management apparatus.

8. The cable management apparatus of claim 7, wherein the attachment clip and the capture arm define a fully enclosed passageway retaining the elongated structure therein in the closed configuration.

9. The cable management apparatus of claim 1, wherein the single piece of material is wire stock.

10. A cable management system, comprising:
a plurality of cable management apparatus according to claim 1.

11. The cable management system according to claim 10, wherein the cable management apparatus are spaced-apart from one another and secured about the same elongated structure.

12. The cable management system according to claim 10, wherein the cable management apparatus are spaced-apart from one another and retain the same cables along lengths of the cables.

* * * * *